United States Patent [19]
Sugimori et al.

[11] Patent Number: 5,798,630
[45] Date of Patent: Aug. 25, 1998

[54] SWITCHING POWER CIRCUIT TO SUPPLY ELECTRIC-VEHICLE BATTERY CHARGER WITH HIGH-FREQUENCY POWER

[75] Inventors: Katsunori Sugimori, Tokyo; Hiroshi Sakamoto, Kumamoto, both of Japan

[73] Assignee: Nippon Electric Industry Co., Ltd., Tokyo, Japan

[21] Appl. No.: 844,816

[22] Filed: Apr. 22, 1997

[30] Foreign Application Priority Data

Jan. 24, 1997 [JP] Japan .................. 9-026170
Feb. 13, 1997 [JP] Japan .................. 9-047163

[51] Int. Cl.$^6$ .................................. H01M 10/46
[52] U.S. Cl. ........................ 320/137; 363/37
[58] Field of Search ..................... 320/137, 140, 320/163, DIG. 28, DIG. 31, 148, 149, 156; 363/13, 34, 37, 95, 98, 131, 132

[56] References Cited

U.S. PATENT DOCUMENTS

| | | | |
|---|---|---|---|
| 4,710,862 | 12/1987 | Asaeda | 363/58 |
| 4,736,283 | 4/1988 | Yasumura | 363/19 |
| 5,260,607 | 11/1993 | Kinbara | 363/56 X |
| 5,414,611 | 5/1995 | Muto et al. | 363/21 |
| 5,610,804 | 3/1997 | Shimizu | 363/21 |

OTHER PUBLICATIONS

Contactless Charging and Communication for Electric Vehicles IEEE Industry Applications Magazine Nov./Dec. 1995.

*Primary Examiner*—Edward Tso
*Attorney, Agent, or Firm*—Jordan and Hamburg

[57] ABSTRACT

A switching power circuit for battery charger, comprising a single-phase full-wave rectifier circuit formed of diodes, a half bridge circuit formed of first and second switching elements connected in series to each other via a diode; a reactor provided between the single-phase full-wave rectifier circuit and the half bridge circuit of the switching elements and having a secondary coil, a series circuit formed of two diodes connected in parallel across the half bridge circuit, a high-frequency transformer having a primary coil connected between the source terminal of the second switching element in the half bridge circuit and the common junction of the two capacitors in the two-capacitors series circuit a secondary coil at which a high-frequency power is delivered to a load forming a battery charger, and a control circuit consisting of a variable frequency multivibrator to turn on and off the first and second switching elements alternately.

4 Claims, 6 Drawing Sheets

SWITCHING POWER CIRCUIT TO SUPPLY ELECTRIC-VEHICLE BATTERY CHARGER WITH HIGH-FREQUENCY POWER

BACKGROUND OF THE INVENTION

1. Field of the Invention

The present invention relates to a battery charger to charge a plurality of storage batteries collectively, and more particularly to a switching power circuit for a battery charger used to charge the storage batteries for driving an electric vehicle.

2. Description of the Prior Art

To efficiently charge the storage batteries for driving an electric vehicle through a simple operation, a non-contact battery charger has been developed which utilizes an electromagnetic induction by a high-frequency transformer.

A switching power circuit to supply the battery charger with a high-frequency power via a high-frequency transformer should essentially have a function of power factor correction by which an input current is made to have a same sinusoidal waveform as an input voltage waveform in order to suppress a harmonic current which will degrade the electromagnetic environment of the power supply system.

The power factor correction circuit using a high-frequency switching has a complicated configuration which makes it impossible to realize a compact and low-cost power circuit.

To simplify the circuit configuration, it has been proposed to use a so-called one-converter type switching power circuit comprising an integration of a PFC converter and DC/DC converter. One example of the one-converter type switching power circuit is shown in FIG. 3.

Figure 3:
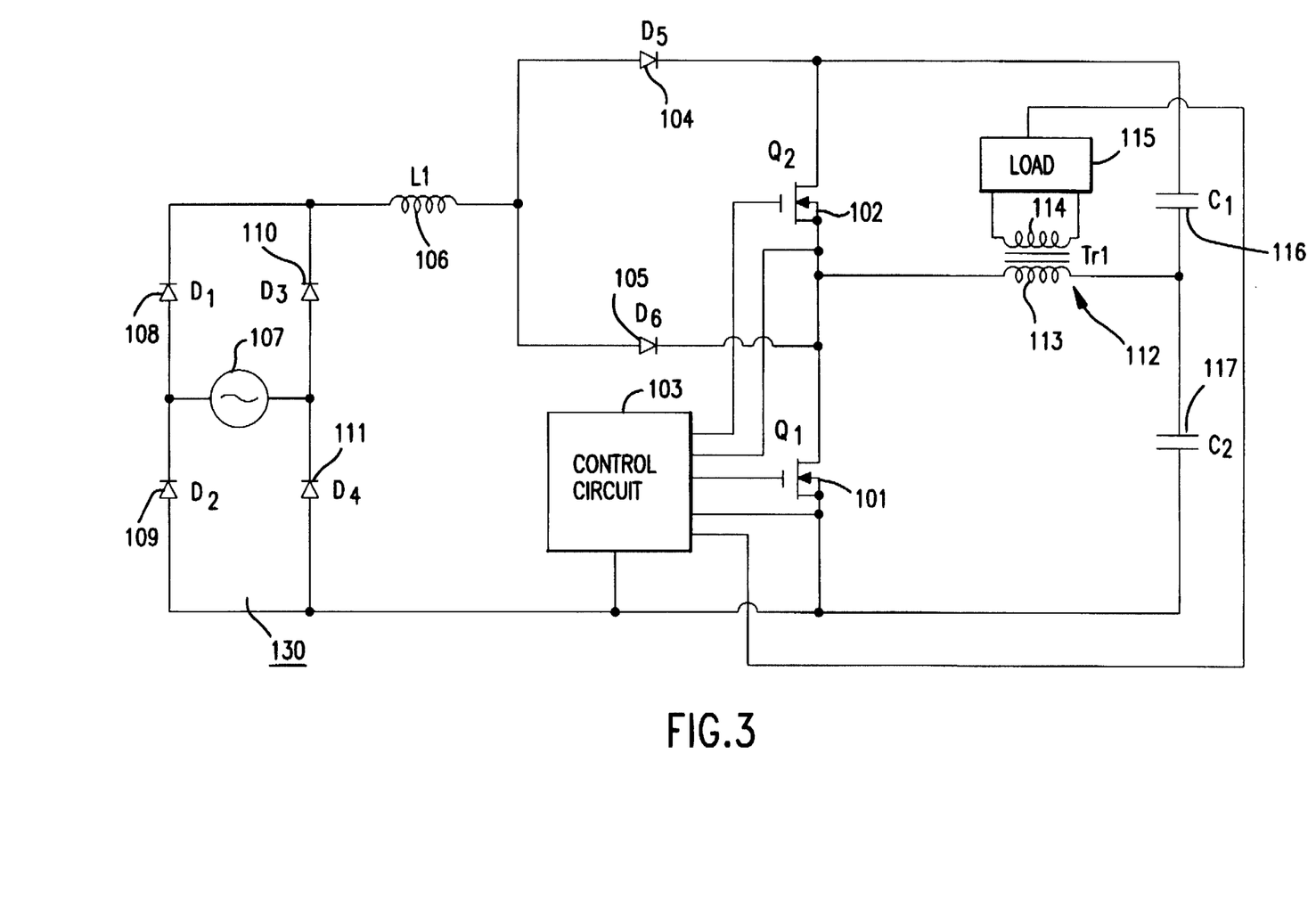
FIG. 3 is a block diagram showing a circuit configuration of a prior-art one-converter type switching power circuit.

FIG. 3 shows a block diagram of a prior-art battery charger switching power circuit consisting of one converter composed of a half bridge type DC/DC converter and a boost type PFC converter in combination.

As shown in FIG. 3, an AC power from an AC circuit 107 is converted to a DC power by a rectifier circuit 130 consisting of four diodes 108 to 111.

A boost reactor 106 is connected to the positive terminal of the rectifier circuit 130. There are provided two diodes 104 and 105 connected at the anodes thereof to the other end of the rectifier circuit 130. A second switching element 102 is provided of which the drain and source terminals are connected in parallel to the cathodes of the two diodes 104 and 105, respectively. Also there is provided a first switching element 101 having drain and source terminals connected between the source terminal of the second switching element 102 and the grounding terminal of the rectifier circuit 130. Thus the first and second switching elements 101 and 102 form together a half bridge circuit.

A series circuit consisting of two capacitors 116 and 117 is connected in parallel across the half bridge circuit consisting of the two switching elements 101 and 102. There is provided a high-frequency transformer 112 having a primary coil 113 connected between the common junction of the two switching elements 101 and 102 and that of the two capacitors. The high-frequency transformer 112 has a secondary coil 114 connected to a load 115 forming a battery charger.

The gate and source terminals of the first and second switching elements 101 and 102, respectively, are connected to a control circuit 103. The control circuit 103 provides a control signal to turn on and off the first and second switching elements 101 and 102 alternately to deliver a high-frequency power to the load 115 via the high-frequency transformer 112.

When the first switching element 101 is turned on, the output voltage of the rectifier circuit 130 is short-circuited by the first switching element 101 via the boost reactor 106 and diode 105, so that an energy is accumulated into the boost reactor 106.

When the first switching element 101 is turned off, the energy accumulated in the boost reactor 106 is discharged via the diode 104 to charge the capacitors 116 and 117.

When the first switching element 101 is turned on, the gradient of the current flowing through the boost reactor 106 is proportional to the output voltage of the rectifier circuit 130. If the current through the boost reactor 106 is in a discontinuous conduction mode (DCM) and the on period of the first switching element 101 is constant, the mean value of the input current is proportional to the output voltage of the rectifier circuit 130. Therefore, the power factor can be made one without any control of the duty ratio. However, since the voltage across the capacitors 116 and 117 is changed considerably by the load current if the frequency is constant, so the frequency should be controlled to control the load voltage.

To overcome the above-mentioned drawbacks, it has been proposed to use a switching power circuit for battery charger of an one-converter type and which employs a variable frequency magnetic-coupled multivibrator (Van-Allen's circuit) or a multivibrator driven by a VF converter to turn on and off alternately a plurality of switching elements forming together an one-converter configuration since the variable frequency magnetic-coupled multivibrator provides for a control circuit of which the output voltage does no vary with any load current and which can have a simplified circuit configuration.

In the above-mentioned one-converter type switching power circuit, however, an excessively large current flows toward the parallel capacitors via the boost reactor and diodes when an AC power is supplied. Therefore, the switching elements and diodes are applied with a large current stress.

Figure 7:
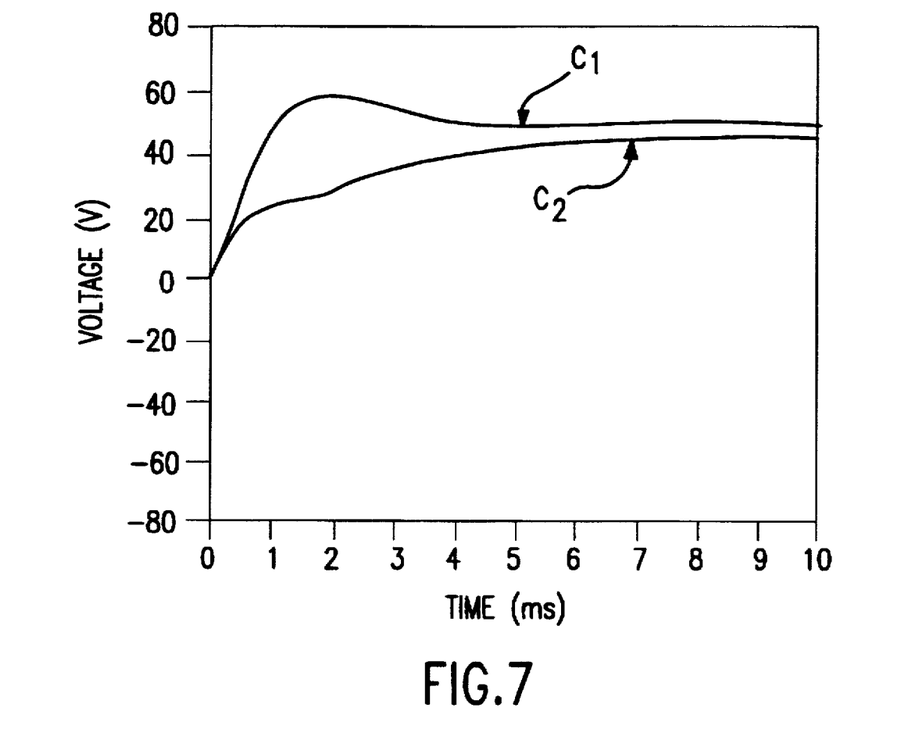
FIG. 7 shows the characteristics of charging voltage to the capacitors in the prior-art one-converter type switching power circuit.

Just after an AC power is supplied, the charging voltage to the two parallel capacitors is high and not balanced as shown in FIG. 7.

Figure 8:
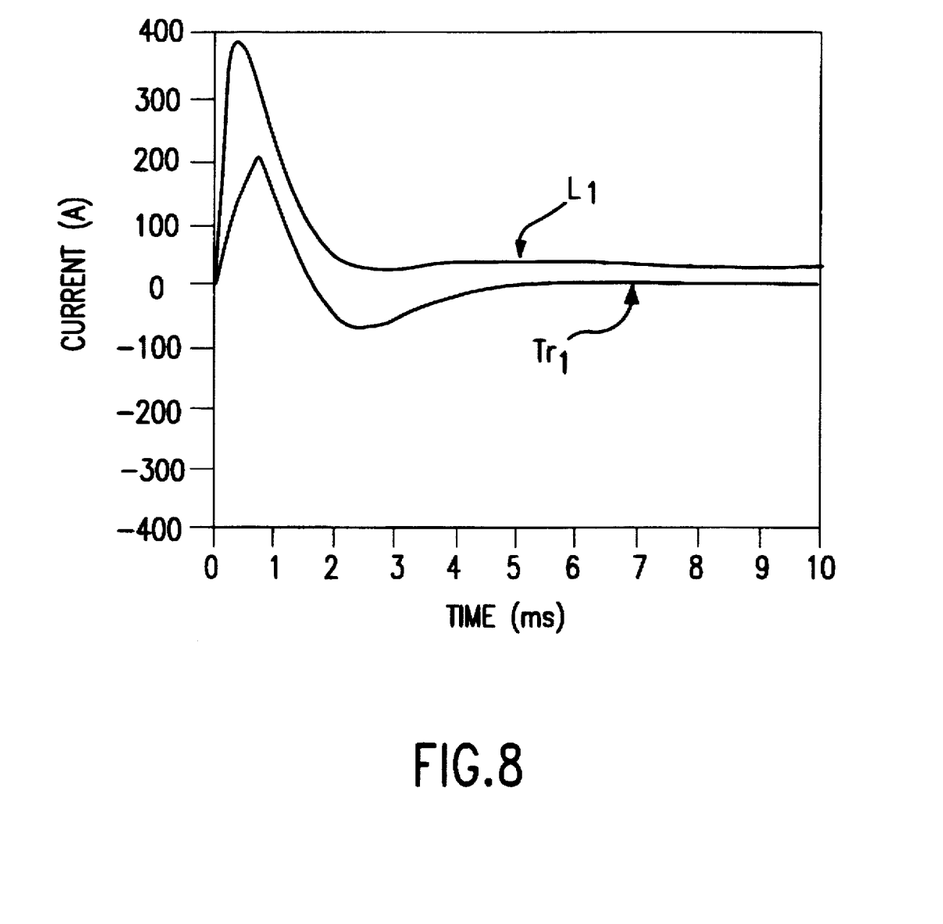
FIG. 8 shows the characteristics of charging current to the boost reactor and high-frequency transformer in the prior-art one-converter type switching power circuit.

Also, the currents $L_1$ and $T_{r1}$ flowing through the boost reactor and the primary coil of the high-frequency transformer, respectively, are shown in FIG. 8, and a large peak current will flow.

SUMMARY OF THE PRESENT INVENTION

The present invention has an object to overcome the above-mentioned drawbacks of the prior art by providing in a boost reactor having a secondary coil to control a charging voltage to two parallel capacitors.

The above object can be accomplished by providing a switching power circuit for battery charger using a reactor having a secondary coil in place of the conventional one-converter type boost reactor, the reactor having a primary coil connected at one end thereof to the positive terminal of a rectifier circuit and at the other end to the drain terminal of a first switching element 1 via a diode 5, the secondary coil of the reactor, different in polarity from the primary coil, being connected at one end thereof to the drain terminal of a second switching element 2 via a diode 4 and at the other end to the grounding terminal of the rectifier circuit.

Also, the second switching element 2 is connected at the source terminal thereof to the drain and source terminals, respectively, of the first switching element 1 via diodes 19 and 18, respectively.

Therefore, when an AC power is supplied, a charging voltage to the parallel capacitors 16 and 17 is blocked and the energy accumulated in the capacitor 17 is circulated via the diode 18.

The one-converter type switching power circuit according to the present invention is composed of switching elements connected in a half bridge configuration.

The converter circuit formed by a full bridge connection of the switching elements is more or less complicated, but since the inrush current when an AC power is supplied can be remarkably suppressed, it is not necessary to suppress the inrush current through a resistor and an electromagnetic contactor in combination or a phase control by a thyristor or a Triac.

The above object of the present invention can also be accomplished by providing an one-converter type switching power circuit for battery charger, comprising four switching elements connected in the full bridge configuration, in which a first half bridge circuit formed of first and second switching elements 31 and 32 connected in series to each other via a diode 39 and a second half bridge circuit formed of third and fourth switching elements 33 and 34 connected in series to each other via a diode 40, are connected in parallel to each other to form a full bridge circuit.

To supply each of the switching elements with a DC power from the rectifier circuit, there are provided first and second reactors each having a primary coil connected at one end thereof in parallel to the positive terminal of the rectifier circuit and a secondary coil connected at one end thereof in parallel to the negative terminal of the rectifier circuit, the primary coil of the first reactor is connected at the other end thereof to the drain terminal of the first switching element 32 via a diode 43, the other end of the primary coil of the second reactor is connected to the drain terminal of the third switching element 34 via a diode 44, and the secondary coils are connected at the other ends thereof to the drain terminal of the second switching element 31 via diodes 41 and 42, respectively.

Also, there is provided a control circuit having a variable frequency multivibrator to turn on and off the two sets of switching elements in the full bridge circuit alternately to generate a high-frequency power, and there in provided a high-frequency transformer having a primary coil connected between the source terminal of the second switching element 31 in the first half bridge circuit and that of the fourth switching element 33 in the second half bridge circuit to supply a high-frequency power to a battery charger via a secondary coil of the high-frequency transformer.

Therefore, by controlling the duty ratios of the first and third switching elements 32 and 34 turning on and off alternately as boost converter, the inrush current developed when an AC power is supplied can be remarkably suppressed.

These and other objects and advantages of the present invention will be better understood from the ensuing description made, by way of example, of the preferred embodiments of the present invention with reference to the drawings.

DETAILED DESCRIPTION OF THE PREFERRED EMBODIMENTS

Figure 1:
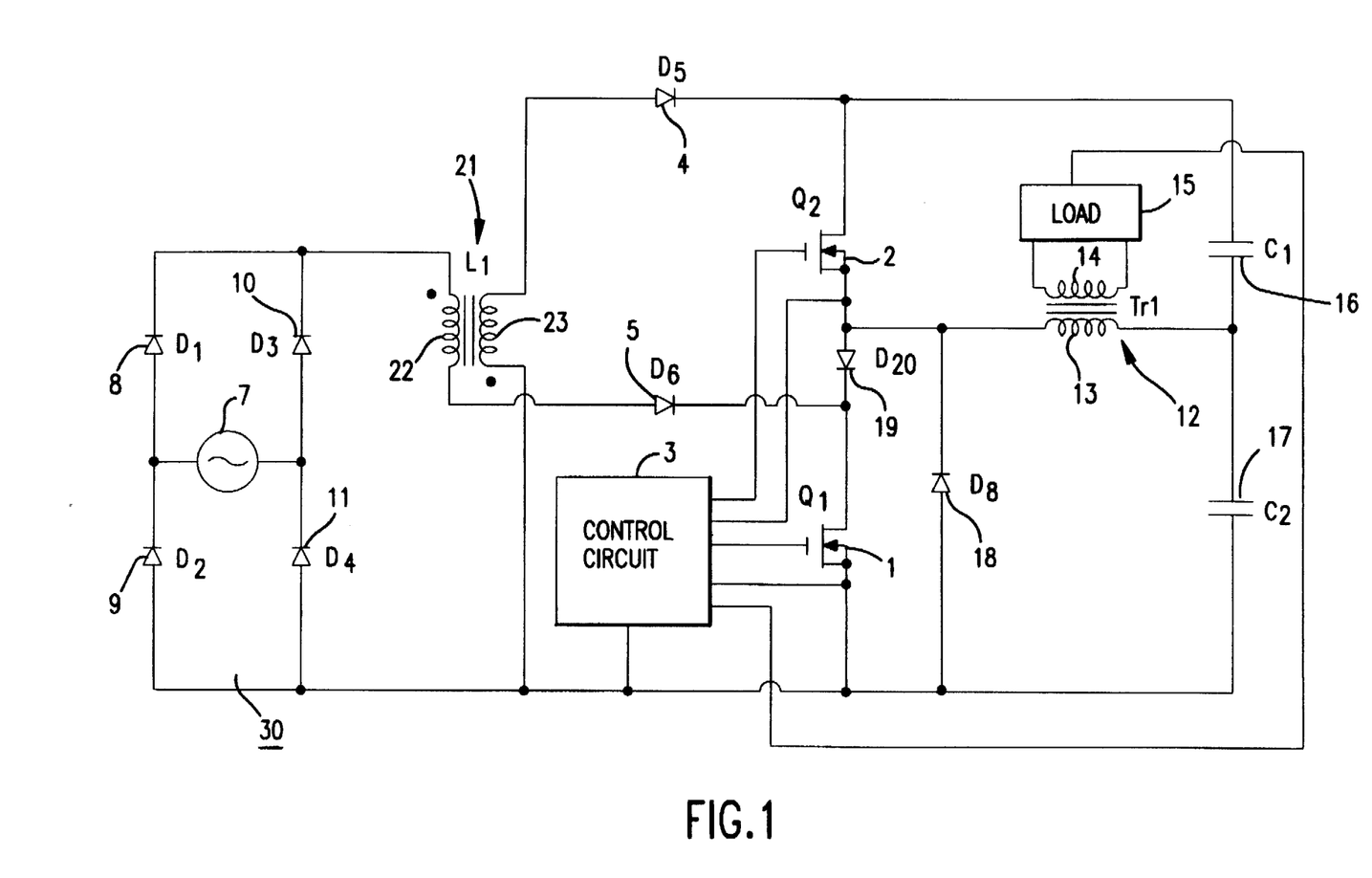
FIG. 1 is a block diagram showing a circuit configuration of a first embodiment of the present invention.
Figure 2:
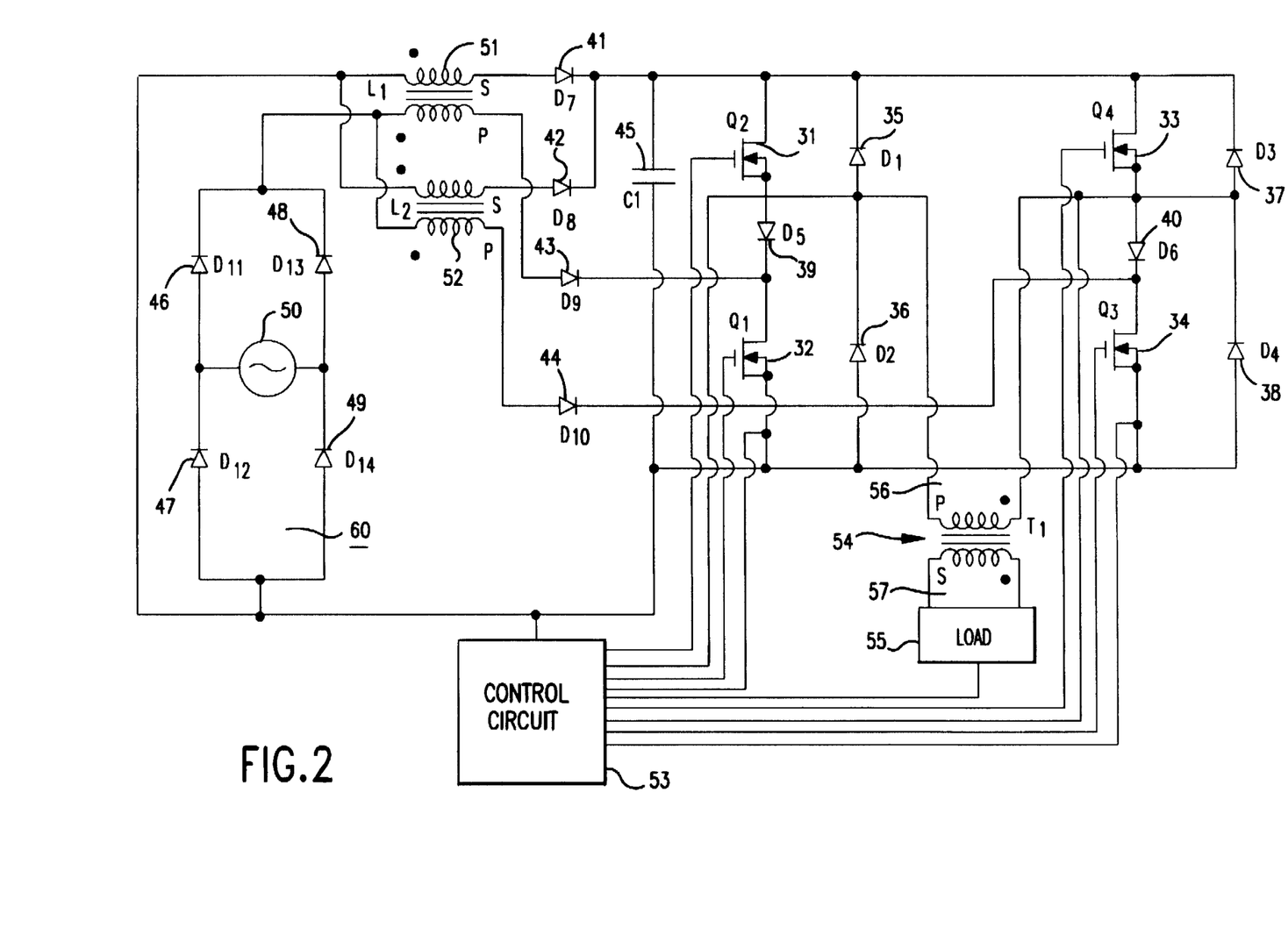
FIG. 2 is also a block diagram showing a circuit configuration of a second embodiment of the present invention.

FIGS. 1 and 2 are block diagrams of the first and second embodiments, respectively, of the switching power circuit for a battery charger according to the present invention.

FIG. 1 schematically illustrates an one-converter type converter circuit for battery charger according to the first embodiment of the present invention, the converter being connected in a half bridge configuration. There is provided a rectifier circuit 30 consisting of four diodes 8 to 11, and there is also provided a reactor 21 having a primary coil 22 connected at one end thereof to the positive terminal of the rectifier circuit 30.

The primary coil 22 of the reactor 21 is connected at the other end thereof to the drain terminal of a first switching element 1 via a diode 5. There is provided a secondary coil 23 connected at one end thereof to the drain terminal of a second switching element 2 via a diode 4, and at the other end to the grounding terminal of the rectifier circuit 30.

Since the first switching element 1 is connected at the drain terminal thereof to the source terminal of the second switching element 2 via a diode 19, a half bridge circuit consisting of the second switching element 2, diode 19 and first switching element 1 forms a parallel circuit to the secondary coil 23 of the reactor 21.

The first and second switching elements 1 and 2 have their respective gate and source terminals connected to a control circuit 3 consisting of a variable frequency multivibrator circuit or a multivibrator driven by a VF converter, and thus are turned on and off alternately by a control signal from the control circuit 3.

There is provided a series circuit consisting of capacitors 16 and 17 and connected in parallel between the drain terminal of the second switching element 2 and the source terminal of the first switching element 1. Also, there is provided a high-frequency transformer 12 having a primary coil 13 connected between the source terminal of the second switching element 12 and the common junction of the capacitors 16 and 17, and a secondary coil 14 connected to a load 15 forming a battery charger, so that a high-frequency power generated by the two switching elements 1 and 2 is supplied to the load 15.

Note that a diode 18 is connected in parallel between the source terminal of the second switching element 2 and that of the first switching element 1 to circulate a charged energy in the capacitor 17.

In the above-mentioned circuit configuration, even when an AC power is supplied, a DC voltage generated by the rectifier circuit 30 is blocked by the diode 19, so the parallel capacitors 16 and 17 will not be charged.

When the first switching element 1 is turned on, the output voltage from the rectifier circuit 30 is short-circuited via the primary coil 22 of the reactor 21 and the diode 5, so an energy is accumulated into the reactor 21.

Next, when the first switching element 1 is turned off while the second switching element 2 is turned on, the energy accumulated in the reactor 21 is charged into the parallel capacitors 16 and 17 via the secondary coil 23 of the reactor 21.

Since the input voltage for activating the first switching element 1 varies depending upon the phase in which an AC power is supplied, the charging current to the capacitors can be controlled by controlling the duty ratio of the first switching element 1 by the control circuit 3.

Figure 4:
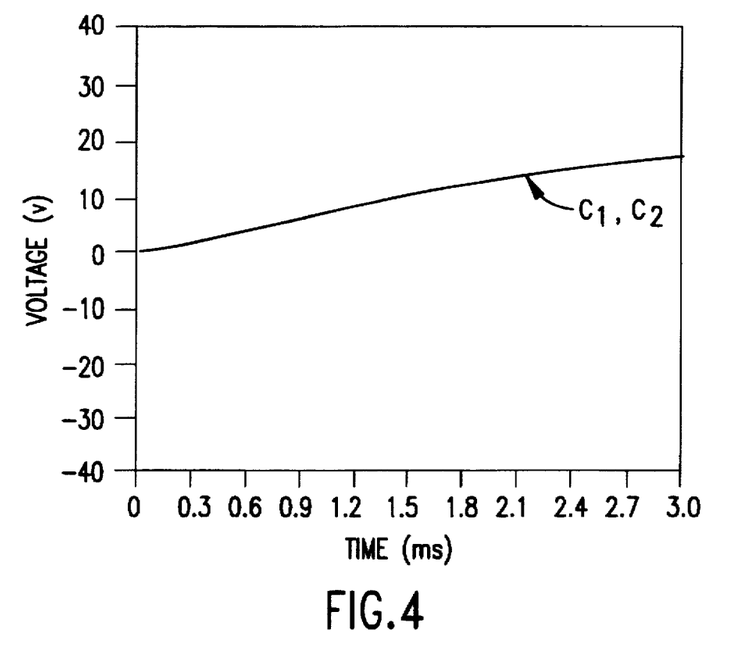
FIG. 4 shows the characteristics of charging voltage to the capacitors in the first embodiment of the present invention.

Therefore, the charging voltage to the capacitors 16 and 17 rises gradually as shown with $C_1$ and $C_2$ in FIG. 4, so that the difference in voltage between the capacitors 16 and 17 will be small.

Figure 5:
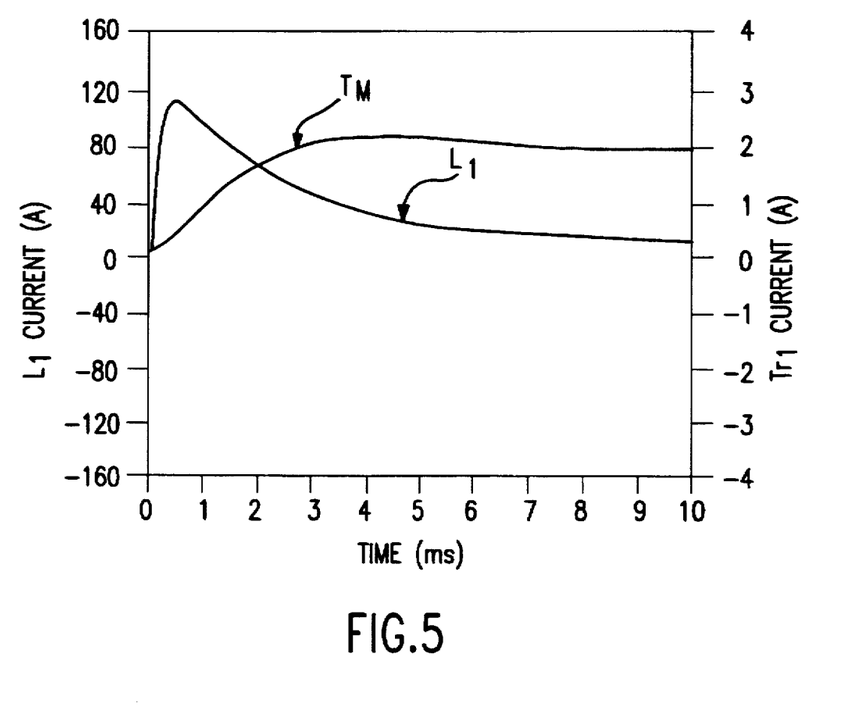
FIG. 5 shows the characteristics of charging current to the reactor and high-frequency transformer in the first embodiment of the present invention.

As the charging voltage to the capacitors 16 and 17 is balanced, the polarized current flowing through the primary coil 13 of the high-frequency transformer 12 becomes smaller with the result that the primary coil current $T_{r1}$ of the high-frequency transformer 12 is reduced as shown in FIG. 5.

Since the secondary coil 22 of the reactor 21 is grounded at one end thereof, the charging voltage to the parallel capacitors 16 and 17 becomes lower and the current $L_1$ flowing through the primary coil 22 of the reactor 21 when the first switching element 1 is turned on has the peak value reduced as shown in FIG. 5.

Next, the circuit configuration of the one-converter type switching power circuit for battery charger consisting of the switching elements connected in the full bridge configuration according to the second embodiment of the present invention will be described with reference to FIG. 2.

As shown in FIG. 2, a rectifier circuit 60 consists of four diodes 46 to 49. The rectifier circuit 60 has a positive terminal connected to one end of the primary coil of a first reactor 51 and that of the primary coil of a second reactor 52.

The primary coil of the first reactor 51 is connected at the other end thereof to the drain terminal of a first switching element 32 via a diode 43, and the primary coil of the second reactor 52 is connected at the other end thereof to the drain terminal of a third switching element 34 via a diode 44.

The secondary coils of the first and second reactors 51 and 52, respectively, are connected at the other end thereof in parallel to the negative terminal of the rectifier circuit 60, and the secondary coils of the first and second reactors 51 and 52, respectively, are connected at the other ends thereof in parallel to each other via diodes 41 and 42.

Across a capacitor 45 connected between the common junction of the diodes 41 and 42 and the negative terminal of the rectifier circuit 60, there is connected in parallel a first half bridge circuit consisting of a second switching element 31, a diode 39 and a first switching element 32, and also there is connected in parallel a second half bridge circuit consisting of a fourth switching element 33, a diode 40 and a third switching element 34. These two half bridge circuits form together a full bridge circuit.

Further a series circuit of diodes 35 and 36 is connected in parallel to the first half bridge circuit, with the common junction between the two diodes 35 and 36 being connected to the source terminal of the fourth switching element 33.

There is provided a high-frequency transformer 54 having a primary coil 56 connected between the source terminal of the second switching element 31 and that of the fourth switching element 33, and a secondary coil 57 connected to a load 55 forming a battery charger to supply the load 55 with a high-frequency power generated by the full bridge circuit.

The four switching elements 31 to 34 forming the full bridge circuit have their respective gate and source terminals connected to a control circuit 53, thus forming four sets of drive circuits.

The control circuit consisting of a variable frequency multivibrator or a multivibrator driven by a VF converter turns on and off a group consisting of the first and fourth switching elements 1 and 4 and a group consisting of the second and third switching elements 2 and 3 alternately.

When the first switching element 32 is turned on, the current through the primary coil of the first reactor 51 rises linearly. When the first switching element 32 is turned off, the energy accumulated in the first reactor 51 is charged into the capacitor 45 via the secondary coil.

When the first and fourth switching elements 32 and 33 are turned on simultaneously, the charged voltage in the capacitor 45 is applied to the primary coil 56 of the high-frequency transformer 54. Next, when the third switching element 34 is turned on, the current through the primary coil of the second reactor 52 rises linearly. When the third switching element 34 is turned off, the energy accumulated in the second reactor 52 is charged into the capacitor 45 via the secondary coil.

When the third and second switching elements 34 and 32 are turned on simultaneously, the charged voltage in the capacitor 45 is reversed in polarity and applied to the primary coil 56 of the high-frequency transformer 54. Namely, the first and third switching elements 32 and 34 work as boost converter and inverter as well.

Since the above-mentioned boost converter is operated in the discontinuous conduction mode (DCM), the envelope and the mean value of an input current are generally proportional to an input voltage, the input power factor is good, the harmonic current is so small that even a small filter can suppress it adequately.

Since the inrush current (charging current to the capacitor 45) developed when an AC power is supplied can be suppressed by controlling the duty ratios of the first and third switching elements 32 and 34 by means of the control circuit 53, no inrush current control circuit has to be provided.

Figure 6:
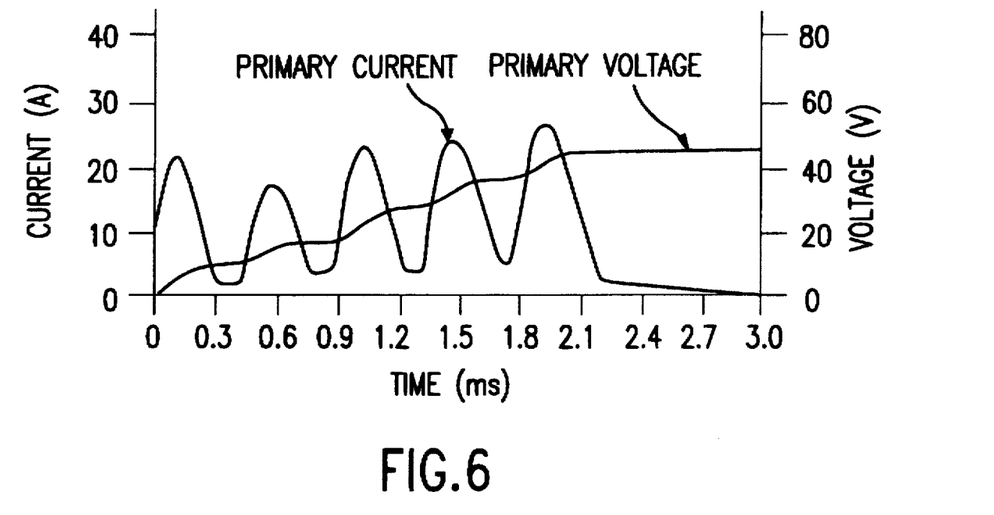
FIG. 6 shows the characteristics of charging voltage and current when an AC power is supplied in the second embodiment of the present invention.

FIG. 6 shows the characteristics of voltage and current when an AC power is supplied in the switching power circuit for battery charger made of the full bridge circuit.

FIG. 6 shows the capacitor voltage (at the primary coil of the high-frequency transformer) and the primary current (output current of the rectifier) when the duty ratio of the boost type switching element is switched at every 0.5 ms. As seen, the inrush current is considerably suppressed and the charging voltage to the capacitor rises gradually.

As having been described in the foregoing, the switching power circuit for battery charger according to the first embodiment of the present invention is a converter circuit composed of the switching circuit connected in the half bridge configuration to the reactor having the secondary coil and the control circuit using the variable frequency multivibrator or a multivibrator driven by a VF converter to turn on and off the two switching elements connected in the half bridge configuration alternately, and the converter circuit according to the second embodiment is composed of the switching circuit in which the two reactors each having a secondary coil and four switching elements are connected in the full bridge configuration to each other and the control circuit composed of the variable frequency multivibrator to divide the four switching elements connected in the full bridge configuration into two groups and turn on and off the switching element groups alternately.

Therefore, since the inrush current when an power is supplied can be remarkably suppressed by controlling the duty ratio of the boost switching elements, it is not necessary to effect phase control by a Triac or a thyristor or the like by additionally providing a resistor and an electromagnetic contactor in combination which would otherwise be provided to suppress the inrush current.

Also, since the switching power circuit for battery charger is of an one-converter configuration, the necessary number of the switching elements and control circuits may be a half of those which would be required, the input power factor is high, the high frequency current is small, and the harmonic current is so small that even a small filter can suppress it adequately. Thus, the present invention provides a compact, highly efficient and economic, highly reliably converter.

What is claimed is:

1. A switching power circuit for battery charger, comprising:

a single-phase full-wave rectifier circuit consisting of diodes (8) to (11) to convert an AC input to a DC power;

a half bridge circuit formed of a first switching element (1) and second switching element (2) connected in series to each other via diode (19);

a reactor (21) having a primary coil connected at one end thereof to the positive terminal of said rectifier circuit and at the other end to the drain terminal of said first switching element via a diode (5), and a secondary coil connected to the drain terminal of said second switching element via a diode (4) and to the negative terminal of said rectifier circuit;

a series circuit formed of two capacitors (16) and (17) connected in parallel across said half bridge circuit;

a diode (18) connected in parallel between the source terminal of said second switching element and that of said first switching element;

a high-frequency transformer (12) having a primary coil (13) connected between the source terminal of said second switching element and the common junction of said two capacitors, and a secondary coil (14) at which a high-frequency power is delivered to a load (15) forming a battery charger; and a control circuit (3) consisting a variable frequency multivibrator or a multivibrator driven by a VF converter having two drive circuits connected to the gate and source terminals of said first switching element and the gate and source terminals of said second switching element to turn on and off the first and second switching elements alternately.

2. A switching power circuit as set forth in claim 1, wherein the duty ratio of said first switching element is controlled to suppress the inrush current developed when an AC power is supplied.

3. A switching power circuit for battery charger, comprising:

a single-phase full-wave rectifier circuit formed of diodes (46) to (49) to convert an AC input to a DC power;

a full bridge circuit composed of a half bridge circuit formed of a first switching element (32) and second switching element (31) connected in series to each other via a diode (39) and a half bridge circuit formed of a third switching element (33) and fourth switching element (34) connected in series to each other via a diode (40), connected in parallel to each other;

a first reactor (51) having a primary coil connected at one end thereof to the positive terminal of said rectifier circuit and at the other end to the drain terminal of said first switching element via a diode (43), and a secondary coil connected to the drain terminal of said second switching element via a diode (41) and to the negative terminal of said rectifier circuit;

a second reactor (52) having a primary coil connected at one end thereof to the positive terminal of said rectifier circuit and at the other end to the drain terminal of said third switching element via a diode (44), and a secondary coil connected to the drain terminal of said second switching element via a diode (42) and to the negative terminal of said rectifier circuit;

a capacitor (45) connected in parallel across said first half bridge circuit;

a series circuit formed of two diodes (35) and (36), with said diode (35) being connected in parallel between the drain and source terminals of said second switching element and said diode (36) being connected in parallel between the source terminal of said second switching element and that of said first switching element;

a series circuit formed of two diodes (37) and (38), with said diode (37) being connected in parallel between the drain and source terminals of said fourth switching element and said diode (38) being connected in parallel between the source terminal of said fourth switching element and that of said third switching element;

a high-frequency transformer (54) having a primary coil (56) connected between the source terminal of said second switching element and the source terminal of said fourth switching element, and a secondary coil (57) at which a high-frequency power is delivered to a load (55) forming a battery charger; and a control circuit (53) consisting of a variable frequency multivibrator or a multivibrator driven by a VF converter having four drive circuits connected to the gate and source terminals of said four switching elements, respectively, in said full bridge circuit to turn on and off a group of said first and fourth switching elements and a group of said second and third switching elements alternately.

4. A switching power circuit as set forth in claim 3, wherein the duty ratios of said first and third switching elements being turned on and off alternately is controlled to suppress the inrush current developed when an AC power is supplied.

* * * * *